United States Patent Office 3,017,353
Patented Jan. 16, 1962

3,017,353
PROCESS FOR PROVIDING A SOLID BODY WITH A PROTECTIVE FILM
James G. Jewell, O'Hara Township, Allegheny County, Pa., assignor to Gulf Research & Development Company, Pittsburgh, Pa., a corporation of Delaware
No Drawing. Filed Dec. 29, 1954, Ser. No. 478,547
11 Claims. (Cl. 252—8.55)

This invention relates to a process for providing a solid body with a protective film and especially to a process for providing a solid body in contact with a mixture of fluids, at least one of which is a polar liquid and another of which is a non-polar liquid and each of which is substantially insoluble in the other, with a protective film comprised essentially of said non-polar liquid. More particularly, this invention relates to a process of inhibiting corrosion of metals in contact with a mixture containing a corrosive medium and a non-corrosive organic liquid present substantially as a separate phase by providing such metals with a protective film of the organic liquid. The process of this invention finds special utility in inhibiting corrosion of metal equipment in contact with a corrosive, oil-containing medium, as, for example, metal equipment used in oil wells producing corrosive mixtures of oil, brine and gas.

An effective method of controlling or inhibiting corrosion of metals in contact with corrosive fluids mixed with a less corrosive liquid, such as mineral oil, entails the formation of a protective film of the less corrosive liquid over the metal surfaces in contact with the corrosive fluids. Efforts in the past to provide the metal surface with such an oil film which would effectively protect the metal for a sufficient length of time, however, have not always proved to be successful.

I have found that a solid body, such as metal, in contact with a corrosive medium containing both polar and non-polar fluids, such as an oil-brine mixture, can be provided with an effective protective film and the corrosive effects of such medium can be substantially reduced by incorporating therein a combination of at least two organic agents, one of which adsorbs to the surface of the solid body and increases the ability of the non-polar component of the corrosive medium to wet the solid body, and the other of which adsorbs to the interface between said polar component and said non-polar component and decreases the interfacial tension therebetween. The compounds to be employed in obtaining the desired film in accordance with my invention should ordinarily be such as to retain their chemical identity in the corrosive medium. By the term "polar component" I mean to include substances such as water, nitrobenzene, acetone, mono-, di-, and tri-chloromethane, phenol, ethyl alcohol, aniline, hydrogen sulfide, and other compounds having dipole moments substantially different from zero; and aqueous solutions containing organic or inorganic agents such as inorganic alkali or alkaline earth metal salts, etc.; and by the term "non-polar component" I mean to include substances such as mineral oil, hexane, decane, and other liquid hydrocarbons, carbon tetrachloride, carbon disulfide, and other compounds having dipole moments of zero or nearly zero, etc. For purposes of explanation, but without intending to be limited thereby, and because the present invention finds particular utility therein, the following discussion will refer to the protection of metallic oil-well equipment, and the polar and non-polar agents in contact therewith will be defined to be water or an aqueous brine and mineral oil, respectively.

The first of the two surface-active agents which is added to the oil or aqueous phase of the oil-water or oil-brine mixture can be defined as a compound which, when added to the aqueous and/or oil phase of the mixture in which it is to be used, reduces to a value below 90°, preferably below 80°, the contact angle of a small drop (about one millimeter in diameter) of the oil phase placed in contact with a plane surface of a solid material immersed in the aqueous phase and similar in composition to the material which is to be protected against corrosive action. Several methods for measuring contact angles are well known to physical chemists. Although it is immaterial which method is used in practice, a convenient one is described in a paper by G. L. Mack appearing in J. Phys. Chem., 40, 159 (1936). Any compound or mixture of compounds which will produce the desired contact angle can be employed in the practice of the invention. Among compounds which can be employed to obtain the desired contact angle with either metals or iron sulfide or both can be mentioned saturated aliphatic carboxylic acids, branched and straight chain, having from 10 to 40 carbon atoms, preferably from 12 to 25 carbon atoms, unsaturated aliphatic carboxylic acids, branched and straight chain, having from 10 to 40 carbon atoms, preferably from 12 to 25 carbon atoms, and amines and amides derived therefrom, such as stearic, palmitic, soybean, cottonseed and oleic acids, octadecyl amine, hexadecyl amine, stearic amide, palmitic amide, soybean amide, cottonseed amide and oleic amide; ammonium and amine salts of the above-mentioned carboxylic acids wherein the total number of carbon atoms in the nitrogen-containing component does not exceed 30, such as the monoethanolamine salt of stearic acid, monoethanolamine salt of cottonseed oil fatty acids, coconut amine salt of oleic acid, ethylenediamine salt of palmitic acid and aniline salt of decanoic acid; amine salts of saturated and unsaturated aliphatic carboxylic acids having from 5 to 20 carbon atoms, wherein the total number of carbon atoms in the amine salt exceeds 10 but the total number of carbon atoms in the ammonium component thereof does not exceed 30, such as octadecenylamine valerate and dodecylamine caproate; polyoxyalkylene esters of fatty acids, saturated and unsaturated, having from 10 to 40 carbon atoms, preferably from 12 to 25 carbon atoms, wherein the number of mols of alkylene oxide groups per mol of acid does not exceed 20, preferably does not exceed 8, such as polyoxyethylene ester of cottonseed fatty acid, polypropyleneoxide ester of oleic acid, polyoxyethylene ester of myristic acid and polyoxypropylene ester of capric acid; the reaction products of the fatty amines described above with polyalkylene oxides wherein the number of alkylene groups does not exceed 20, preferably does not exceed 8, such as polyoxyethylene derivatives of lauric amine, polyoxypropylene derivatives of soybean amines, polyoxyethylene derivatives of octadecyl amine, polyoxypropylene derivatives of n,n-dibutylcaprylic amine; mono-, di-, and tri-esters of anhydroalkitols with saturated and unsaturated carboxylic acids having from 10 to 40 carbon atoms, preferably from 12 to 25 carbon atoms, such as sorbitan monopalmitate, sorbitan monooleate and sorbitan tristearate; quaternary ammonium halides, in particular alkyltrimethylammonium chlorides and dialkyldimethylammonium chlorides wherein the alkyl group contains from 10 to 30 carbon atoms, such as dimethylditetradecylammonium chloride, trimethyloctadecenylammonium chloride, dimethyldidodecylammonium chloride, trimethyloctadecadienylammonium chloride and trimethyldodecylammonium bromide; the composite amide formed from a mixture of alpha-hydroxy and ketohydroxy carboxylic acids having an average molecular weight of about 325; and imidazolines represented by the following general formula:

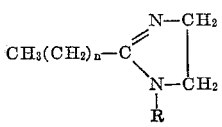

wherein R is a short chain aliphatic hydrocarbon radical having from 3 to 8 carbon atoms, and $n$ is an integer from 10 to 30.

The second of the two surface-active agents can be defined as a compound which, when added to the oil or aqueous phase of the oil-water or oil-brine mixture in which it is to serve as a constituent of a corrosion inhibitor, lowers the interfacial tension between the aqueous phase and the organic phase or between the aqueous and oil phases to a value below about 10 dynes per centimeter and preferably to a value below about 5 dynes per centimeter. The desired interfacial tension can conveniently be, but need not be, measured with a Du Nöuy tensiometer. This is described briefly in Taylor and Glasstone, "A Treatise on Physical Chemistry" (Van Nostrand, New York, volume II, pages 418 and 419). Any compound which will lower the interfacial tension to the desired value can be employed. Many compounds and mixtures adequate for such purpose are known to chemists and others skilled in the art. Among the compounds which can be mentioned to obtain the desired interfacial tension are amine salts of saturated and unsaturated aliphatic carboxylic acids having from one to 4 carbon atoms, wherein the total number of carbon atoms in the amine salt exceeds 10 but the total number of carbon atoms in the ammonium component thereof does not exceed 30, such as stearic amine acetate, palmitic amine butyrate and coconut amine propionate; polyalkyleneglycol esters of fatty acids, saturated and unsaturated, having from 12 to 20 carbon atoms, such as polyethyleneglycol monoricinoleate, polyethyleneglycol monostearate, polyethyleneglycol monooleate, and polyethyleneglycol monopalmitate; polyoxyalkylene derivatives of the fatty acid esters of anhydroalkitols with carboxylic acids having from 10 to 30 carbon atoms, preferably 12 to 25 carbon atoms, such as polyoxyethylene sorbitan trioleate, polyoxyethylene sorbitan monostearate and polyoxypropylene sorbitan monolaurate; cyclohexylamine acetate; Amine 220 (an organic base manufactured by Carbide and Carbon Chemicals Company, New York, New York having the structure

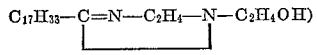

sodium alkyl aryl sulfonates of the type commonly employed in making detergents, such as sodium decylbenzenesulfonate; alkyl aryl sulfonic acids, that is "wax" benzene sulfonic acids and mahogany acids and metal salts thereof, such as the alkali metal, ammonium and alkaline earth metal, including calcium and magnesium, salts; sulfated fatty alcohols, such as sulfated cetyl alcohol; alkali metal soaps of fatty acids, such as sodium stearate, sodium palmitate, and sodium oleate; and alkali metal soaps of tall oil, such as the sodium soap of tall oil.

The two organic agents employed in the practice of my invention, one primarily to reduce the contact angle of an oil drop against a metal surface to about 90 degrees or less, the other primarily to reduce the interfacial tension between the aqueous phase and the oil phase of the corrosive medium (hereinafter referred to as class I and class II agents, respectively, as a matter of convenience) are not employed arbitrarily but cooperate in a synergistic fashion to obtain the desired and effective protective film on the metal surface.

The addition of a class I agent to a corrosive medium containing an aqueous phase and an oil phase which will adsorb to the metal surface and wet the same will reduce somewhat the contact angle of the oil on the metal surface. While the addition of more class I agent to the corrosive medium may tend to reduce further the contact angle of the oil, it will do so only with extreme difficulty, for further decrease of the contact angle resulting from adsorption of additional class I agent to the metal surface is strongly opposed by the increasing interfacial energy between the oil and the water as the contact angle becomes smaller. In accordance with my invention a further decrease in the contact angle of the oil on the metal surface is obtained not by the further addition of a class I agent to the oil-brine mixture but by the addition thereto of an agent which will reduce the interfacial tension between the oil drop and the brine, and thereby decrease the interfacial energy which opposes the decrease in contact angle.

It is extremely important, however, that the class I agent be such and present in an amount sufficient to reduce the contact angle of a small drop of the organic phase to a value of 90° or lower, preferably 80° or lower, if the class II agent is to be effective in further reducing the contact angle of the organic phase. If the contact angle of a small drop of the organic phase is above 90°, the class II agent, regardless of how effective it may be in reducing the interfacial tension between the organic phase and the brine, will usually be ineffective in further reducing the contact angle of the organic phase. In fact in such case reducing the interfacial tension between the aqueous phase and the organic phase usually permits a drop of the organic phase to approach its normal spherical shape and thus increase rather than decrease the contact angle obtained as a result of using class I agents alone. It is also desirable to use a class I agent that is effective without itself producing a large decrease in the interfacial tension in order that the class II agent may be most effective in reducing the contact angle still further.

In treating the corrosive medium in accordance with the present invention, I can dissolve the treating agents in either or both of the defined phases forming a part of such corrosive medium. In general the amount of class I agent that need be used need be only an amount such that it alone will be sufficient to cause a drop of the organic phase to assume a contact angle below 90°, preferably below 80°. The amount of class II agent needed in combination with a class I agent is that amount which will reduce the interfacial tension between the oil and the water below about 10 dynes per centimeter, preferably below about 5 dynes per centimeter. In general about 1/10,000 to about 1/50, preferably about 1/5,000 to about 1/1,000, volumes of class I agent, and about 1/15,000 to about 1/50, preferably about 1/5,000 to about 1/1,000, volumes of class II agents, per volume of the phase in which the agent is dispersed, are suitable for purposes of the present invention.

The benefits to be derived by simultaneously adding both class I and class II agents in accordance with this invention to a solution containing polar and non-polar compounds can be seen from the following examples. In Table I are shown the effects of class I and class II agents on the contact angle of a specially purified kerosene in water against an iron-sulfide-coated steel surface. The class I agents employed are stearic acid, cottonseed oil fatty acids, stearic amine, and coconut amide, while the class II agent used in each case was Hypodyne 3A (a mixture of amine salts of selected polybasic acids having a molecular weight of about 343 and a specific gravity of 0.96 manufactured by the Ferro Chemical Company, Bedford, Ohio). The class I and class II agents were dissolved in kerosene and water, respectively. Substantially the same results are obtained when Armac TD is used as the class II agent in place of Hypodyne 3A in the water. Armac TD is a mixture of primary aliphatic amine acetates manufactured by the Armour Chemical Division of Armour Company, the amine content being approximately 30 percent hexadecyl, 25 percent octadecyl and 40 percent octadecenyl amine.

Table I

| Class I Agent and Concentration | Concentration of Class II Agent (mg./ml.) | Interfacial Tension (dynes/cm.) | Contact Angle in Degrees |
|---|---|---|---|
| None | 0.2 | 1.6 | 180 |
| Stearic Acid (1 mg./ml.) | 0.0 | 17.9 | 53 |
| Do | 0.2 | <0.1 | 21 |
| None | 0.2 | 1.6 | 180 |
| Cottonseed Oil Fatty Acid (1 mg./ml.) | 0.0 | 13.4 | 46 |
| Do | 0.2 | <0.1 | 18 |
| None | 0.2 | 1.6 | 180 |
| Stearic amine (1 mg./ml.) | 0.0 | 10.3 | 102 |
| Do | 0.2 | 0.9 | 19 |
| None | 0.2 | 1.6 | 180 |
| Coconut amide (1 mg./ml.) | 0.0 | <0.1 | 78 |
| Do | 0.2 | <0.1 | 50 |

The synergistic effects obtained by the incorporation of both class I and class II agents to a solution containing kerosene and water are apparent from an inspection of the data in Table I. A small amount of any of the class II agents alone in water failed completely to render the metal surface preferentially wettable to kerosene. A small amount of class I agent alone in the solution helped to render the metal surface preferentially wettable to kerosene. However, the presence of both class I and class II agents in the solution proved to be more effective than either of the two individually, and in three of the four cases the combination of the two agents was sufficient to reduce the contact angle of the kerosene on the metal surface to a value as low as 21° or less.

In Table II are shown additional data establishing the benefits of this invention. The polar solution was water, the organic material kerosene, the metal surface 1020 Steel, the class I agent Neo-Fat S-142 (oleic-linoleic acid produced by Armour Chemical Division), and the class II agent Tween 85 (polyoxyethylene sorbitan trioleate, a product of the Atlas Powder Company). Each of the agents was dissolved in the kerosene.

Table II

| Concentration of Class I Agent (mg./ml.) | Concentration of Class II Agent (mg./ml.) | Interfacial Tension (dynes/cm.) | Contact Angle in Degrees |
|---|---|---|---|
| 1.0 | 0.0 | 31.6 | 24 |
| 0.5 | 0.0 | 30.4 | 77 |
| 0.2 | 0.0 | 36.9 | 128 |
| 0.05 | 0.0 | 79.8 | 151 |
| 0 | 1.0 | 0.1 | 113 |
| 0 | 0.5 | 0.3 | 124 |
| 0 | 0.2 | 0.3 | 157 |
| 0 | 0.05 | 3.0 | 151 |
| 0.5 | 0.5 | 0.2 | 6 |
| 0.5 | 0.2 | 0.3 | 20 |
| 1.0 | 0.5 | 0.3 | <6 |
| 0.2 | 0.2 | 0.4 | 20 |

The synergistic effects to be derived by employing class I and class II agents in combination can also be seen from the data in Table II. The employment of a class II agent in a concentration as high as one milligram per milliliter of kerosene failed to effect a contact angle below 113°. While an angle of 77° was obtained by using the relatively large amount of 0.5 milligram of class I agent per milliliter of kerosene, an even larger concentration of class I agent, one milligram per milliliter of kerosene, was required to reduce the contact angle to 24°. It should be noted, however, that even in the latter case, an equivalent weight of a combination of the two agents decreased the contact angle to 6°. In fact, even lesser total amounts of the two agents reduced the contact angle of the kerosene more than larger amounts of either of the agents alone. Thus, while 0.5 milligram of each of class I and class II agents will reduce the contact angle to 77° and 124°, respectively, 0.4 milligram of the two will reduce the contact angle to 20°.

Table III below shows the effect of adding a class I agent (diethanolamine salt of cottonseed fatty acids) and a class II agent (Priminox 10, a mixture of polyethoxyamines, of which the predominant portion can be represented by the formula:

$$\text{t-}C_{18-24}H_{37-49}NH(CH_2CH_2O)_5H$$

manufactured by the Rohm and Haas Company and described in the technical bulletin entitled "Priminox Series," Polyethoxyamines), to the water-kerosene system. Each of the agents was dissolved in kerosene.

Table III

| Concentration of Class I Agent (mg./ml.) | Concentration of Class II Agent (mg./ml.) | Interfacial Tension (dynes/cm.) | Contact Angle in Degrees |
|---|---|---|---|
| 0.0 | 1.0 | 0.1 | 110 |
| 0.0 | 0.5 | 3.1 | 118 |
| 1.0 | 0.0 | 11.8 | 40 |
| 0.5 | 0.0 | 18.9 | 56 |
| 0.2 | 0.0 | 20.8 | 84 |
| 1.0 | 1.0 | <1 | 11 |
| 0.5 | 0.5 | <3 | 34 |
| 0.2 | 0.5 | <3 | 44 |
| 0.2 | 1.0 | <1 | 34 |

The same synergistic effect obtained previously by employing class I and class II agents is also obtained in Table III. Note that while 1.0 milligram of the class I agent reduces the contact angle to 40° and the same amount of the class II agent reduces the contact angle to 110°, the same total amount of class I and class II agents reduces the contact angle to 34°.

The benefits of the present invention are further illustrated in Tables IV and V wherein a class I agent (diethanolamine salt of cottonseed fatty acids) is used in combination with a class II agent (Visco 953, manufactured by the Visco Chemical Corporation) in Table IV and a Class II agent (Visco 987, manufactured by the Visco Chemical Corporation) in Table V. The mixtures treated were water and kerosene. Each of the agents was dissolved in kerosene.

Table IV

| Concentration of Class I Agent (mg./ml.) | Concentration of Class II Agent (mg./ml.) | Interfacial Tension (dynes/cm.) | Contact Angle in Degrees |
|---|---|---|---|
| 0.0 | 0.2 | 1.1 | 134 |
| 0.0 | 0.5 | 0.9 | 115 |
| 1.0 | 0.0 | 11.8 | 40 |
| 0.5 | 0.0 | 18.9 | 56 |
| 0.2 | 0.0 | 20.8 | 90 |
| 0.25 | 0.25 | 1.0 | 39 |
| 0.1 | 0.1 | 1.8 | 59 |

Table V

| Concentration of Class I Agent (mg./ml.) | Concentration of Class II Agent (mg./ml.) | Interfacial Tension (dynes/cm.) | Contact Angle in Degrees |
|---|---|---|---|
| 0.0 | 0.2 | 0.8 | 113 |
| 0.5 | 0.0 | 18.9 | 56 |
| 0.2 | 0.0 | 20.8 | 90 |
| 0.1 | 0.1 | 2.2 | 70 |

Again it can be seen from the data in Tables IV and V that combinations of class I and class II agents produce smaller contact angles than can be obtained by using a similar weight of either of the agents alone. In Table IV, it will be noted that the contact angles obtained by using a total of 0.5 and 0.2 milligram of the class I and class II agents, 39° and 59°, respectively, are substantially smaller than those obtained by using equivalent weights of either of the agents alone. In Table V, 0.2 milligram of class II agent reduced the contact angle to 113° and a similar amount of class I agent reduced the contact angle to 90°. However, a total concentration of 0.2 milligram, half being class I and half class II, reduced the contact angle to 70°.

The desired improvement in accordance with my invention is additionally shown in Table VI wherein a class I agent (diethanolamine salt of cottonseed fatty acids) is employed in combination with a class II agent (Nonisol 100, which is manufactured by the Alrose Chemical Company, is a polyethyleneglycol ester of lauric acid, the glycol portion thereof having a molecular weight of 400). The system treated was water and kerosene, and each of the agents was dissolved in kerosene.

*Table VI*

| Concentration of Class I Agent (mg./ml.) | Concentration of Class II Agent (mg./ml.) | Interfacial Tension (dynes/cm.) | Contact Angle in Degrees |
|---|---|---|---|
| 0.0 | 1.0 | 0.8 | 92 |
| 0.0 | 0.5 | 3.0 | 124 |
| 0.0 | 0.2 | 7.6 | 151 |
| 0.0 | 0.05 | 12.7 | 175 |
| 1.0 | 0.0 | 11.8 | 41 |
| 0.5 | 0.0 | 18.9 | 56 |
| 0.2 | 0.0 | 20.8 | 90 |
| 0.5 | 0.5 | <3 | 38 |
| 1.0 | 0.5 | <3 | 37 |
| 0.2 | 1.0 | <1 | 59 |
| 0.05 | 1.0 | <1 | 89 |
| 0.5 | 1.0 | <1 | 24 |

Here, too, the synergistic effects obtained by employing class I and class II agents are shown. As will be apparent from the data in Table VI, the contact angle obtained with a combination of class I and class II agents is smaller than that obtained by using either of the agents alone.

While I have indicated above that class I agents adsorb to the metal surface and increase the ability of the non-polar component of the corrosive medium to wet the same and that class II agents adsorb to the interface between the polar and non-polar components forming a part of such medium and decrease the interfacial tension therebetween, this is a slight over-simplification. Seldom, if ever, do chemical additives behave in this ideal fashion; polar agents which adsorb to one interface can usually be expected to adsorb to the other interface, however slightly. Accordingly, some of the compounds employed as either class I or class II agents, while functioning primarily as one class of agents, will also function to some degree as the other. Thus, Hypodyne 3A and Tween 85, shown in Tables I and II, respectively, while primarily class II agents also function somewhat as class I agents. This is believed to account for the fact that while a small amount of stearic amine in Table I and small amounts of Neo-Fat S-142 in Table II were unable to reduce the contact angle of the hydrocarbon to less than 90°, the addition thereto of Hypodyne 3A and Tween 85, respectively, was effective in further reducing the contact angle of the hydrocarbon.

Obviously, many modifications and variations of the invention, as hereinabove set forth, can be made without departing from the spirit and scope thereof, and therefore only such limitations should be imposed as are indicated in the appended claims.

I claim:
1. A process for providing a metal body in contact with a mixture containing a mineral oil and a brine solution with a protective film comprised essentially of said mineral oil which comprises incorporating in said mixture a combination of at least two surface-active agents, one of which adsorbs to the surface of said metal body and reduces the contact angle of said mineral oil on said metal body to below 90° and is selected from the group consisting of aliphatic carboxylic acids having from 10 to 40 carbon atoms, aliphatic amines having from 10 to 40 carbon atoms, aliphatic amides having from 10 to 40 carbon atoms and lower aliphatic amine salts of a carboxylic acid having from 10 to 40 carbon atoms and another of which adsorbs to the interface between said mineral oil and said brine solution and decreases the interfacial tension therebetween to below about 10 dynes per centimeter and is selected from the group consisting of amine salts of an aliphatic carboxylic acid having from one to four carbon atoms wherein the total number of carbon atoms in the amine salt exceeds 10 but the total number of carbon atoms in the amine component thereof does not exceed 30, polyoxyalkylene derivatives of the fatty acid esters of anhydroalkitols with carboxylic acids having from 10 to 30 carbon atoms, polyethoxylated higher alkyl amines and polyethyleneglycol esters of higher fatty acids.

2. A process for providing a metal body in contact with a mixture containing a mineral oil and a brine solution with a protective film comprised essentially of said mineral oil which comprises incorporating in said mixture an aliphatic carboxylic acid having from 10 to 40 carbon atoms in an amount sufficient to reduce the contact angle of said mineral oil on said metal body to below 90° and an amine salt of an aliphatic carboxylic acid having from one to four carbon atoms wherein the total number of carbon atoms in the amine salt exceeds 10 but the total number of carbon atoms in the amine component thereof does not exceed 30 in an amount sufficient to reduce the interfacial tension between said mineral oil and said brine solution to below about 10 dynes per centimeter.

3. A process for providing a metal body in contact with a mixture containing a mineral oil and a brine solution with a protective film comprised essentially of said mineral oil which comprises incorporating in said mixture cottonseed oil fatty acids in an amount sufficient to reduce the contact angle of said mineral oil on said metal body to below 90° and stearic amine acetate in an amount sufficient to reduce the interfacial tension between said mineral oil and said brine solution to below about 10 dynes per centimeter.

4. A process for providing a metal body in contact with a mixture containing a mineral oil and a brine solution with a protective film comprised essentially of said mineral oil which comprises incorporating in said mixture an aliphatic carboxylic acid having from 10 to 40 carbon atoms in an amount sufficient to reduce the contact angle of said mineral oil on said metal body to below 90° and polyoxyalkylene derivatives of the fatty acid esters of anhydroalkitols with carboxylic acids having from 10 to 30 carbon atoms in an amount sufficient to reduce the interfacial tension between said mineral oil and said brine solution to below about 10 dynes per centimeter.

5. A process for providing a metal body in contact with a mixture containing a mineral oil and a brine solution with a protective film comprised essentially of said mineral oil which comprises incorporating in said mixture cottonseed oil fatty acids in an amount sufficient to reduce the contact angle of said mineral oil on said metal body to below 90° and polyoxyethylene sorbitan trioleate in an amount sufficient to reduce the interfacial tension between said mineral oil and said brine solution to below about 10 dynes per centimeter.

6. A process for providing a metal body in contact with a mixture containing a mineral oil and a brine solution with a protective film comprised essentially of said mineral oil which comprises incorporating in said mixture an aliphatic amine having from 10 to 40 carbon atoms in an amount sufficient to reduce the contact angle of said mineral oil on said metal body to below 90° and an amine salt of an aliphatic carboxylic acid having from on to four carbon atoms wherein the total number of carbon atoms in the amine salt exceeds 10 but the total number of carbon atoms in the amine component thereof does not exceed 30 in an amount sufficient to reduce the interfacial tension between said mineral oil and said brine solution to below about 10 dynes per centimeter.

7. A process for providing a metal body in contact with a mixture containing a mineral oil and a brine solution with a protective film comprised essentially of said mineral oil which comprises incorporating in said mixture octadecyl amine in an amount sufficient to reduce the contact angle of said mineral oil on said metal body to below 90° and stearic amine acetate in an amount sufficient to reduce the interfacial tension between said mineral oil and said brine solution to below about 10 dynes per centimeter.

8. A process for providing a metal body in contact with a mixture containing a mineral oil and a brine solution with a protective film comprised essentially of said mineral oil which comprises incorporating in said mixture an aliphatic amine having from 10 to 40 carbon atoms in an amount sufficient to reduce the contact angle of said mineral oil on said metal body to below 90° and polyoxyalkylene derivatives of the fatty acid esters of anhydroalkitols with carboxylic acids having from 10 to 30 carbon atoms in an amount sufficient to reduce the interfacial tension between said mineral oil and said brine solution to below about 10 dynes per centimeter.

9. A process for providing a metal body in contact with a mixture containing a mineral oil and a brine solution with a protective film comprised essentially of said mineral oil which comprises incorporating in said mixture octadecyl amine in an amount sufficient to reduce the contact angle of said mineral oil on said metal body to below 90° and polyoxyethylene sorbitan trioleate in an amount sufficient to reduce the interfacial tension between said mineral oil and said brine solution to below about 10 dynes per centimeter.

10. A process for providing a metal body in contact with a mixture containing a mineral oil and a brine solution with a protective film comprised essentially of said mineral oil which comprises incorporating in said mixture a lower aliphatic amine salt of a carboxylic acid having from 10 to 40 carbon atoms in an amount sufficient to reduce the contact angle of said mineral oil on said metal body to below 90° and an amine salt of an aliphatic carboxylic acid having from one to four carbon atoms wherein the total number of carbon atoms in the amine salt exceeds 10 but the total number of carbon atoms in the amine component thereof does not exceed 30 in an amount sufficient to reduce the interfacial tension between said mineral oil and said brine solution to below about 10 dynes per centimeter.

11. A process for providing a metal body in contact with a mixture containing a mineral oil and a brine solution with a protective film comprised essentially of said mineral oil which comprises incorporating in said mixture monoethanolamine salt of cottonseed oil fatty acids in an amount sufficient to reduce the contact angle of said mineral oil on said metal body to below 90° and stearic amine acetate in an amount sufficient to reduce the interfacial tension between said mineral oil and said brine solution to below about 10 dynes per centimeter.

References Cited in the file of this patent

UNITED STATES PATENTS

| | | |
|---|---|---|
| 2,460,259 | Kahler | Jan. 25, 1949 |
| 2,614,982 | Caldwell et al. | Oct. 21, 1952 |
| 2,614,983 | Caldwell et al. | Oct. 21, 1952 |
| 2,649,415 | Sundberg et al. | Aug. 18, 1953 |
| 2,756,211 | Jones | July 24, 1956 |
| 2,782,164 | Fischer | Feb. 19, 1957 |
| 2,839,465 | Jones | June 17, 1958 |